Patented Nov. 17, 1953

2,659,138

UNITED STATES PATENT OFFICE 2,659,138

METHOD OF BRAZING AND BRAZING ALLOY

Philip T. Stroup, New Kensington, Pa., assignor to Aluminum Company of America, Pittsburgh, Pa., a corporation of Pennsylvania No Drawing. Application December 10, 1948, Serial No. 64,699

7 Claims. (Cl. 29—359)

This invention relates to an improved composition of matter particularly useful in the brazing of aluminous materials, the latter term being used to designate aluminum and alloys thereof which contain more than 50 per cent of that metal. The invention also contemplates novel methods of brazing aluminous material. The problems to which the invention relates, and to which it offers at least a partial solution, are fundamental to brazing compositions used in the brazing of aluminous material and arise from the fact that the joint formed by brazing the aluminous parts is usually the portion of the completed brazed article least resistant to corrosion and from the further fact that the brazing composition should have a melting point low enough that the temperature necessarily used to place it in a molten state will not be so high as to permanently impair the physical properties of the aluminous parts which are to be joined by the brazing operation. Thus the perfect composition for brazing aluminous materials would be one which melted at a very low temperature and likewise possessed a resistance to corrosion equal to that of the aluminous materials which were to be joined by the brazing operation. In order to satisfy the requirement of corrosion resistance it is necessary to use a brazing composition having an aluminum base, but, aluminum having a relatively high melting point, it is likewise necessary to add to that metal elements which will reduce its melting point. The addition of such elements produces an alloy having a corrosion resistance less than that of pure aluminum so that, in the end, the brazing composition is, at best, a compromise.

The object of this invention is to provide brazing alloys for use in the brazing of aluminous materials which possess to a superior extent the desirable properties of high corrosion resistance and low melting point.

To this end I provide an improved brazing composition which, broadly considered, consists of aluminum, silicon and germanium, the silicon being present in amounts of about 1.5 to about 12 per cent by weight and the germanium being present in amounts of about 3.5 to about 47 per cent by weight and the balance being aluminum of a purity hereinafter discussed. The invention is based on my discovery that the conventional and widely used brazing compositions consisting essentially of aluminum and silicon are greatly improved by the addition of germanium, the improvement consisting in a substantial lowering of the melting point of the composition without substantial decrease in the corrosion resistance of the composition. Aluminum-silicon alloys have heretofore been widely used as brazing alloys because of their relatively low melting point and relatively high resistance to most corrosive agents, but their melting point has not been low enough to allow universal application of such alloys in brazing aluminous materials. Therefore, it has been customary to add other elements, such as copper and zinc, to these alloys to obtain a brazing composition of lower melting point. However, such added elements have sharply decreased the corrosion resistance of the aluminum-silicon alloy. The new composition of this invention is substantially as resistant to corrosion as the aluminum-silicon alloys but substantially lower in melting point, the alloys of this invention melting within a range of about 800 to 1050° F. An additional advantage of my new brazing compositions is the manner in which they flow when held at temperatures immediately above their melting point. At such temperatures these compositions are very fluid and are capable of entering comparatively small interstices or spaces. This property is of great importance in brazing operations where the parts to be brazed are positioned slightly apart from each other and the molten brazing composition flowed into the spaces defined by adjacent surfaces of said parts. The flow characteristics of the compositions of this invention are such that the space between the brazed parts may be reduced, thus reducing the amount of brazing composition necessarily used and thereby increasing the relative corrosion resistance of the joint.

While the advantages just described are typical of the alloys of this invention within the composition limits above indicated, I have found that within these composition limits there are a series of alloys which possess these improved properties to a high degree. These are the alloys which contain about 11.5 minus X per cent by weight of silicon and about 4.5X per cent by weight of germanium where X represents a number not less than about 1 and not greater than about 10.5. These series of alloys possess an exceptional combination of low melting point, fluidity and resistance to corrosion and are preferred among the alloys within the scope of this invention as brazing alloys in the brazing of aluminous materials.

I prefer, to the extent commercially feasible, to limit the composition of the alloy to aluminum, germanium and silicon, but such metals are not commercially obtainable in pure form and some other metals or metalloids will always be present to some extent. Occasionally, it may likewise be desirable to add other metals or metalloids. I have found that for best results it is desirable to so limit the amount of metals or metalloids, other than the aluminum, germanium and silicon, that in total amount they do not exceed about 0.5 per cent by weight of the total alloy. I have also found it desirable to limit those of these elements which melt at temperatures over 2000° F., e. g., iron, manganese, titanium, chromium, to not greater than about 0.25 per cent by weight of any one. The alloy is, therefore, substantially free from any substances that might obstruct its flow under brazing conditions. Thus the most desirable alloys of the type herein described contain a total of at least about 99.5 per cent by weight of aluminum, germanium and silicon and thus consist essentially of those metals.

In the aluminum, silicon, germanium alloys above described there often occur small amounts of relatively low melting constituent. The presence of this constituent in many cases may be disregarded. However, where it is desirable that during brazing the brazing alloy melt within a minimum melting range, the low melting constituent may be eliminated by preheating the brazing alloy at temperatures between 760° and the solidus temperature, preferably below 900° F., prior to its use. To this end heating necessary to effect substantial elimination of the relatively low melting constituent will vary with the dimensions of the brazing alloy article being heated, but may readily be determined by trial. Usually the desired effect is produced by heating at the above indicated temperatures for a period over 30 minutes.

The heating step above described, if conducted within the temperature range of 760°–780° F., may likewise be advantageously used when the assembly formed by the brazing operation is intended for use at relatively high temperatures. In this case the assembly, after brazing, is subjected to the above described heating step, thereby insuring the elimination of low melting constituent at the brazed joint and substantially eliminating the possibility of joint weakness due to incipient fusion of low melting constituent therein.

This application is a continuation-in-part of my copending application Serial No. 647,651 filed February 14, 1946, now abandoned.

Having thus described my invention, I claim:

1. In the method of brazing aluminous articles in which the joining of adjacent surfaces is accomplished by the fusion and subsequent solidification of brazing alloy therebetween, the improvement consisting in utilizing therein as the brazing alloy a metallic composition composed essentially of the elements silicon, germanium and aluminum, said elements composing at least 99.5 per cent by weight of the total composition, the percentage of silicon by weight being equal to 11.5 minus X, and the percentage of germanium by weight being equal to 4.5X, where X represents a number of 1 to 10.5 inclusive.

2. In the method of brazing aluminous articles in which the joining of adjacent surfaces is accomplished by the fusion and subsequent solidification of brazing alloy therebetween, the improvement consisting in utilizing therein as a brazing alloy a metallic composition, 99.5 per cent of the total weight of which is composed of the elements aluminum, silicon and germanium, the element silicon composing about 1.5 to about 12 per cent by weight of said composition and the element germanium composing about 3.5 to about 47 per cent by weight of said composition.

3. The process of claim 2 characterized by the fact that said brazing alloy is preheated within the range of 760° F. to its solidus temperature prior to said fusion thereof between said surfaces, said preheating extending over a sufficient length of time to eliminate any low melting point constituent.

4. The process of claim 2 characterized by the fact that after solidification of said brazing alloy between said surfaces the resultant brazed assembly is heated for at least 30 minutes within a temperature range of about 760° F. to about 780° F.

5. A brazing alloy composed essentially of silicon, germanium and aluminum and containing not more than about 0.5 per cent by weight of other metal or metalloid, the percentage of silicon by weight being about equal to 11.5 minus X and the percentage of germanium by weight being about equal to 4.5X where X represents a number not less than about 1 nor greater than about 10.5.

6. The brazing composition set forth in claim 5 characterized by the fact that the alloy does not contain more than about 0.25 per cent by weight of any one element, other than silicon, that melts at temperatures over 2000° F.

7. A brazing alloy melting between about 850° F. and about 1000° F. consisting essentially of from 13.4% to 42.8% germanium, from 2.0 to 8.6% silicon and from 55% to 77.4% aluminum.

PHILIP T. STROUP.

References Cited in the file of this patent

UNITED STATES PATENTS

| Number | Name | Date |
|---|---|---|
| 500,125 | Guttner | June 27, 1893 |
| 2,359,926 | McCullough | Oct. 10, 1944 |
| 2,386,889 | Furry | Oct. 16, 1945 |
| 2,508,008 | Block | May 16, 1950 |

OTHER REFERENCES

Transactions of The Electrochemical Society, vol. 89 (1946), pp. 277, 278, and 288. (Copy in Div. 56.)

Chem. Abstracts, vol. 34 (1940), p. 7764. (Copy in Scientific Library.)

Metall and Erz., vol. 25 (1926), pp. 682–684. (Copy in Scientific Library.)